US008756616B2

(12) United States Patent
di Flora

(10) Patent No.: US 8,756,616 B2
(45) Date of Patent: Jun. 17, 2014

(54) SYSTEM AND METHOD FOR REDUCING THE STATIC FOOTPRINT OF MIXED-LANGUAGE JAVA CLASSES

(75) Inventor: Cristiano di Flora, Lempäälä (FI)

(73) Assignee: Core Wireless Licensing S.A.R.L., Luxembourg (LU)

(*) Notice: Subject to any disclaimer, the term of this patent is extended or adjusted under 35 U.S.C. 154(b) by 1772 days.

(21) Appl. No.: 11/618,518

(22) Filed: Dec. 29, 2006

(65) Prior Publication Data

US 2008/0163265 A1 Jul. 3, 2008

(51) Int. Cl.
*G06F 9/54* (2006.01)
(52) U.S. Cl.
USPC .......................................................... 719/328
(58) Field of Classification Search
CPC .......................................................... G06F 8/36
USPC .......................................................... 719/328
See application file for complete search history.

(56) References Cited

U.S. PATENT DOCUMENTS

| | | | | | |
|---|---|---|---|---|---|
| 5,835,771 | A | * | 11/1998 | Veldhuizen | 717/154 |
| 6,066,181 | A | * | 5/2000 | DeMaster | 717/148 |
| 2005/0044540 | A1 | * | 2/2005 | Savov | 717/166 |
| 2005/0149914 | A1 | * | 7/2005 | Krapf et al. | 717/136 |

OTHER PUBLICATIONS

Czajkowski, G.; Daynes, L.; Wolczko, M., Automated and Portable Native Code Isolation. Proceedings of the 12th International Symposium on Software Reliability Engineering, 2001 (ISSRE 2001). pp. 298-307 [retrieved from IEEE on Mar. 5, 2010].*
Chen, M.; Goldenberg, S.; Srinivas, S.; Ushakov, V.; Wang, Y.; Zhang, Q.; Lin, E.; Zach, Y. Java JNI Bridge: A Framework for Mixed Native ISA Execution. Proceedings of the International Symposium on Code Generation and Optimization (Mar. 26-29, 2006). pp. 65-75. [retrieved from IEEE on Mar. 5, 2010].*
Mulchandani, Deepak. Java for Embedded Systems. IEEE Internet Computing. vol. 2, Issue 3 (May/Jun. 1998). pp. 30-39. [retrieved from IEEE on Mar. 5, 2010].*
Schade, Andreas. Automatic Generation of Bridging Code for Accessing C++ from Java. Proceedings of Technology of Object-Oriented Languages and systems, TOOLS '97 (Nov. 24-28, 1997). pp. 165-180. [retrieved from IEEE on Mar. 5, 2010].*
Sun Microsystems' Press Release, "JavaSoft Ships Java 1.0" (Jan. 23, 1996) [retrieved from http://webarchive.org/web/20070517165904/http://www.sun.com/smi/Press/sunflash/1996-01/sunflash.960123.xml on Jul. 6, 2010].*
Sun Microsystems' Press Release, "Sun Ships JDK 1.1 —JavaBeans Included" (Feb. 19, 1997) [retrieved from http://web.archive.org/web/20080210044125/www.sun.com/smi/Press/sunflash/1997-02/sunflash.970219.0001.xml on Jul. 6, 2010].*

(Continued)

*Primary Examiner* — H S Sough
*Assistant Examiner* — Brian W Wathen
(74) *Attorney, Agent, or Firm* — Winstead PC

(57) ABSTRACT

A system and a method for minimizing the functionality-gap between JAVA™ and native platforms while keeping the impact on each JAVA™ API static footprint as small as possible. A JAVA™ Runtime Dynamic Invocation API is used for low-level bridging between JAVA™ and C/C++, enabling the dynamic invocation of native C/C++ functions and C++ class/object methods from the JAVA™ side without adding any additional ad hoc implemented native code to the overall JAVA™ component implementation. Thereby, the need to write new native code when implementing a JAVA™ component that needs to invoke some native functionality is reduced.

36 Claims, 4 Drawing Sheets

(56) References Cited

OTHER PUBLICATIONS

Sun Microsystems' Press Release, "Sun Delivers Next Version of the Java Platform" (Dec. 8, 1998) [retrieved from http://web.archive.org/web/20070816170028/http://www.sun.com/smi/Press/sunflash/1998-12/sunflash.981208.9.xml on Jul. 6, 2010].*

Sun Microsystems' Press Release, "Sun Anounces Latest Version of Java 2 Platform Standard Edition" (Feb. 6, 2002) [retrieved from http://web.archive.org/web/20070815095726/http://www.sun.com/smi/Press/sunflash/2002-02/sunflash.20020206.5.xml on Jul. 6, 2010].*

Sun Microsystems' Press Release, "Sun Ships New Version of Java Platform" (Sep. 30, 2004) [retrieved from http://web.archive.org/web/20080207083457/www.sun.com/smi/Press/sunflash/2004-09/sunflash.20040930.1.xml on Jul. 10, 2010].*

Sun Microsystems, "Java Naming" (Feb. 11, 2005) [retrieved from http://www.java.com/en/about/brand/naming.jsp on Jul. 10, 2010].*

Ethan Nicholas, "Introducing Java SE 6 Update 10 " (Apr. 2008) [retrieved from http://java.sun.com/developer/technicalArticles/javase/java6u10/index.html on Jul. 10, 2010].*

Sun Microsystems, "The Java History Timeline" (Nov. 1, 2006) [retrieved from java.com/en/ javahistory/timeline.jsp on Jul. 10, 2010].*

"java", Dictonary.com Unabridged, Random House, Inc. [retrieved on Sep. 30, 2013 from http://dictionary.reference.com/browse/java].*

"java", Webster's Third New International Dictionary of the English Language Unabridged, (1966), G&C Merriam Company, p. 1211.*

Java Trademark, Registration No. 2,178,784, Published Oct. 8, 1996 [retrieved from http://tess2.uspto.gov].*

Java Trademark, Registration No. 3,681,468, Published Mar. 28, 2006 [retrieved from http://tess2.uspto.gov].*

Java Trademark, Registration No. 2,298,389, Published Dec. 7, 1999 [retrieved from http://tess2.uspto.gov].*

Challa, S.; Laksberg, A., "Essential Guide to Managed Extensions for C++" (2002), Apress, Inc., pp. 201-218 [retrieved from http://link.springer.com/chapter/10.1007/978-1-4302-0834-1_16].*

Shaver, M.; Ang, M., "Inside the Lizard a Look at the Mozilla Technology and Architecture" (May 29, 2000), pp. 1-6 [retrieved from http://www-archive.mozilla.org/docs/ora-oss2000/arch-overview/moz-arch-overview.pdf].*

Turner, D.; Oeschger, I., "Creating XPCOM Components" (2003), Brownhen Publishing, pp. 1-270 [retrieved from http://www-archive.mozilla.org/projects/xpcom/book/cxc/pdf/cxc.pdf].*

* cited by examiner

SYSTEM AND METHOD FOR REDUCING THE STATIC FOOTPRINT OF MIXED-LANGUAGE JAVA CLASSES

FIELD OF THE INVENTION

The present invention relates generally to native code invocation from JAVA™ classes. More particularly, the present invention relates to systems for reducing the size and static footprint of "mixed language" or mixed-mode code JAVA™ classes, i.e., classes having one or more methods implemented in programming languages other then JAVA™.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

JAVA™ is an object-oriented programming language and platform that was originally developed in the early 1990s. JAVA™ components can invoke native platform application programming interfaces (APIs) by using a standard native code embedding mechanism, commonly referred to as a JAVA™ Native Interface (JNI™) The JNI™ is primarily intended to foster native API reuse or to implement mission-critical parts of the code in a native language for improved efficiency. The JNI™ approach is quite helpful for the reuse of existing APIs from JAVA™. The JNI™ allows a component written in the JAVA™ language to call code written in any other programming language by declaring one or more native JAVA™ methods, implementing a native library containing one or more functions that implement the native JAVA™ methods in a different programming language, loading the library that contains the native code, and then calling the native method.

The static footprint of a JNI™-based mixed-language JAVA™ class comprises two primary contributions, namely the JAVA™ class (bytecode) footprint and the additional native code footprint. Native code comprises the method's business logic implementation and additional JNI™-specific boilerplate code (e.g., for marshalling/un-marshalling I/O parameters between JAVA™ and native side, to create new JAVA™ objects and/or to invoke methods on a JAVA™ object from native code). Invoking native objects from JAVA™ via JNI™ requires the addition of more JAVA™-side and native-side boilerplate code in order to deal with a native object's lifecycle (i.e., invocation of a native object constructors, methods, and destructors) since JNI™ relies on a procedural programming model. Thus, object-oriented concepts must be implemented from scratch on top of the functional JNI™ programming model.

When using JNI™ to implement JAVA™ system components and APIs, developers must find a satisfactory trade-off between a pair of conflicting requirements. The first such requirement is to provide a minimum functionality-gap, meaning that most of the native APIs available to native developers should be available to JAVA™ components as well. The second requirement is for a minimum JAVA™ component static footprint. In other words, adding new JAVA™ APIs to a certain JAVA™ runtime should not have a strong impact on the overall JAVA™ runtime static footprint in terms of both native and JAVA™ libraries to be added. This requirement is very important when deploying and running JAVA™ platforms on embedded and mobile devices which often possess relatively low memory and processing capabilities.

Unfortunately, the above two requirements conflict with each other, as minimizing the functionality-gap by using JNI™ can cause the final static footprint of a JAVA™ component to increase significantly. This is commonly referred to as footprint explosion. In fact, the one-to-one relationship between native JAVA™ methods and functions in the native implementation makes the amount of native code used to implement native JAVA™ methods increase when the number of JAVA™ native methods to implement increases. Even if native boilerplate code can be reused by wrapping frequently used libraries in a JAVA™ API, as depicted in FIG. 1, it is still difficult to avoid footprint explosion since the more native functions are wrapped, the larger the size of the additional JNI™ code. This conflict is even more difficult to solve when dealing with object-oriented native APIs due to the existing programming model mismatch between the JNI™ C primitives and the C++ object-oriented programming model.

A number of proposals have been made to enable JAVA™ wrapping of native C++ objects. These proposals are discussed, for example, in the Simplified Wrapper and Interface Generator (SWIG) User's Manual 1.1, (available at the SWIG website); U.S. Pat. No. 6,066,181, issued May 23, 2000; and U.S. Patent Publication No. 2005/0044540, published Feb. 24, 2005. These documents discuss a pair of strategies for the JAVA™ wrapping. However, the processes discussed in these documents do not allow for the minimizing of the static footprint, as they require one new native library for each class/function to be integrated. Therefore, the minimizing of the functionality gap with these systems can easily lead to footprint explosion since all boilerplate code cannot be re-used.

In addition to the above, MICROSOFT® Corporation's C# Programmer's Reference: Platform Invoke Tutorial (available at the MSDN: Microsoft Development website), while somewhat useful, is strictly limited to the invocation of native procedural APIs and not for the invocation of object-oriented APIs.

There is therefore a need for a system and method of reducing the functionality gap between JAVA™ and native platform, while at the same time providing only a minimum impact on the static footprint of the JAVA™ environment.

SUMMARY OF THE INVENTION

Various embodiments of the present invention involve a system and a method for minimizing the functionality-gap between JAVA™ and native platforms while keeping the impact on each JAVA™ API static footprint as small as possible. The various embodiments provide a general purpose mechanism for low-level bridging between JAVA™ and C/C++, enabling the dynamic invocation of native C/C++ functions and C++ class/object methods from the JAVA™ side without adding any additional ad hoc implemented native code to the overall JAVA™ component implementation. In this way, the need to write new native code when implementing a JAVA™ component that needs to invoke some native functionality is drastically reduced.

With the various embodiments of the present invention, the need for writing JNI™ native code in JAVA™ component (e.g. JSR) implementations is reduced, as is the amount of boilerplate code that is needed for JNI™ invocation. In addition, these various embodiments enable JAVA™ developers to write JAVA™ applications that consume native APIs without writing any additional application-specific native code. Still further, with these embodiments, JAVA™ consumers can reuse all of the needed JAVA™ and native boilerplate code, thus reducing the overall size of the resulting JAVA™ consumer APIs. This system can also be used to reduce start-up time and dynamic footprints, as there are fewer native libraries to load, and libraries are only loaded once. Still further, this system and method can also be used for garbage collection of native C++ objects instantiated by a JAVA™ application.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Various embodiments of the present invention involve a system and a method for minimizing the functionality-gap between JAVA™ and native platforms while keeping the impact on each JAVA™ API static footprint as small as possible. The various embodiments provide a general purpose mechanism for low-level bridging between JAVA™ and C/C++, enabling the dynamic invocation of native C/C++ functions and C++ class/object methods from the JAVA™ side without adding any additional ad hoc implemented native code to the overall JAVA™ component implementation. In this way, the need to write new native code when implementing a JAVA™ component that needs to invoke some native functionality is drastically reduced.

Figure 1:
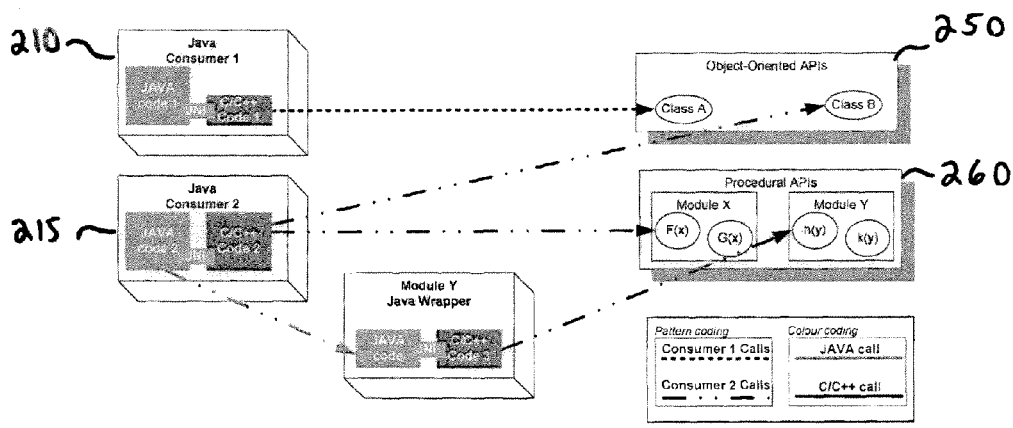
FIG. 1 is a representation showing the process by which a conventional JNI™-based invocation of C/C++APIs from JAVA™ occurs.
Figure 2:
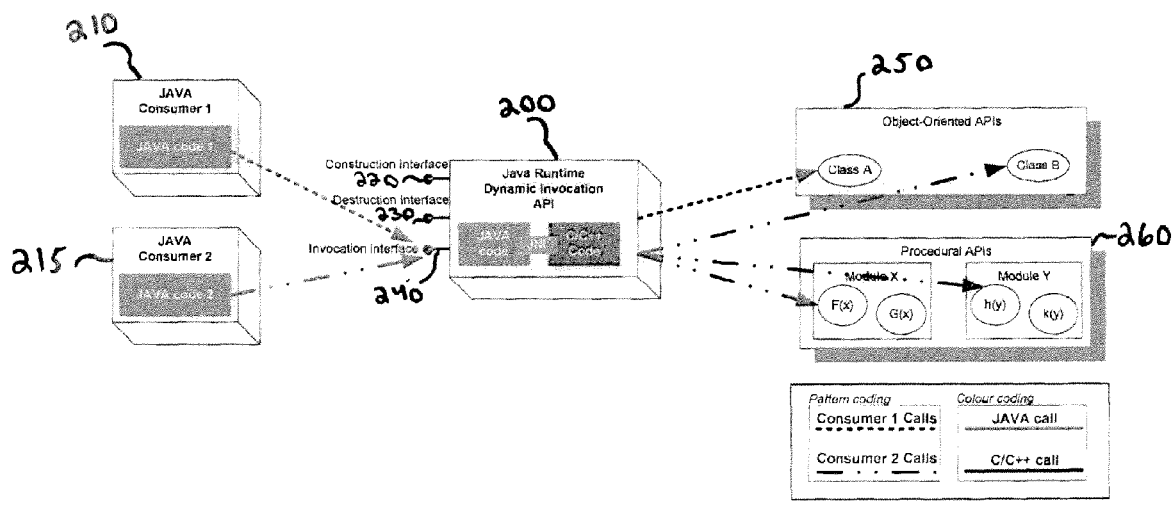
FIG. 2 is a representation showing how native APIs may be invoked without the use of any additional invocation-specific JNI™ code according to various embodiments of the present invention.

FIG. 2 is a representation demonstrating how native APIs may be invoked without the use of any additional invocation-specific JNI™ code according to various embodiments of the present invention. According to the various embodiments of the present invention, JAVA™ runtime is enriched by a general purpose JAVA™ Runtime Dynamic Invocation (JRDI) API 200. The JRDI API 200 provides JAVA™ consumers (represented as a first JAVA™ consumer 210 and a second JAVA™ consumer 215) with a pure JAVA™ programming model to native APIs. The JRDI API 200 is responsible for allowing JAVA™ applications to create and destroy instances of basic native language entities (i.e. objects, primitive data-type variables, structures, function pointers) at run-time, as well as to invoke methods and functions at runtime. For clarity purposes, these different primitives are depicted in FIG. 2 as being divided into three different interfaces—a construction interface 220, a destruction interface 230, and an invocation interface 240. Each interface implementation includes all of the needed boilerplate code that is required for dealing with common JNI™-based tasks related to the dynamic creation and destruction of C/C++ variables and objects, as well as the invocation of native functions and methods. The JRDI API 200 in turn can interact with a plurality of object-oriented APIs 250 and procedural APIs 260 via C/C++ calls, relaying calls from the first and second JAVA™ consumers 210 and 215, respectively.

A set of JAVA™ peer classes, referred to herein as JavaPointers, is used to represent dynamically allocated native entities on the JAVA™ side. Different types of native entities, such as objects and primitive variables, are represented on the JAVA™ side by an instance of a dedicated JAVA™ class, e.g., a NativeObjectPointer or a Native StructurePointer instance. As a result of programming idioms and interfaces provided by the JRDI API, JAVA™ applications can use a JavaPointer as a type of JAVA™ peer-pointer in order to invoke methods on dynamically allocated native entities, or to use them as I/O arguments when invoking another entity's functionality. In this sense, a JavaPointer is used in the same way as a native application would use native pointers to manage dynamically allocated variables.

Various embodiments of the present invention operate under the assumption that the JAVA™ runtime comprises two points of functionality. First, there needs to be a working mechanism for embedding native code in JAVA™ components by using the standard JNI™ mechanism. Second, there must also be a working mechanism for loading native dynamic link libraries (DLLs) at run-time.

The following is a description of a first use case involving the creation of an effective system-development JAVA™ platform for memory-constrained devices. In this situation, a mobile device manufacturer desires to include a powerful pure-JAVA™ application development platform on a memory-constrained device. In order to accomplish this goal, almost all on-device native functionality should be exposed to JAVA™ via a set of JAVA™ mixed language classes representing platform features and system calls. In this case, however, standard JNI™ coding can easily lead to static footprint explosion, as the number of native functions/methods to expose can be quite large (e.g., around $10^6$ functions/methods to wrap on the latest releases of one operating system). This in turn makes a pure JNI™-based approach unsuitable for memory-constrained devices. If a general purpose native platform invocation JAVA™ component is available, JAVA™ developers can exploit it to invoke whatever native API are needed from JAVA™ without having to write and install any additional C/C++ application-specific library. In this way, device manufacturers can provide an effective system-development JAVA™ platform that is suitable for memory constrained devices since it has a minimum impact on the overall JAVA™ platform static footprint.

The following is a description of a second use case involving the small footprint implementation of different time-critical methods by re-using a large native C++ object-oriented API. In this case, a JAVA™ developer wishes to implement a large number of time-critical methods of a JAVA™ class. It has been decided to implement them in the C++ programming language because the developer wishes to re-use an existing library of C++ classes. Since JNI™ does not provide support for invocation of object-oriented APIs, the wrapping of the needed class library can require the developer to write a lot of native and JAVA™ boilerplate code. However, this problem can be alleviated if the developer can invoke the native C++ object-oriented API from JAVA™.

Figure 3:
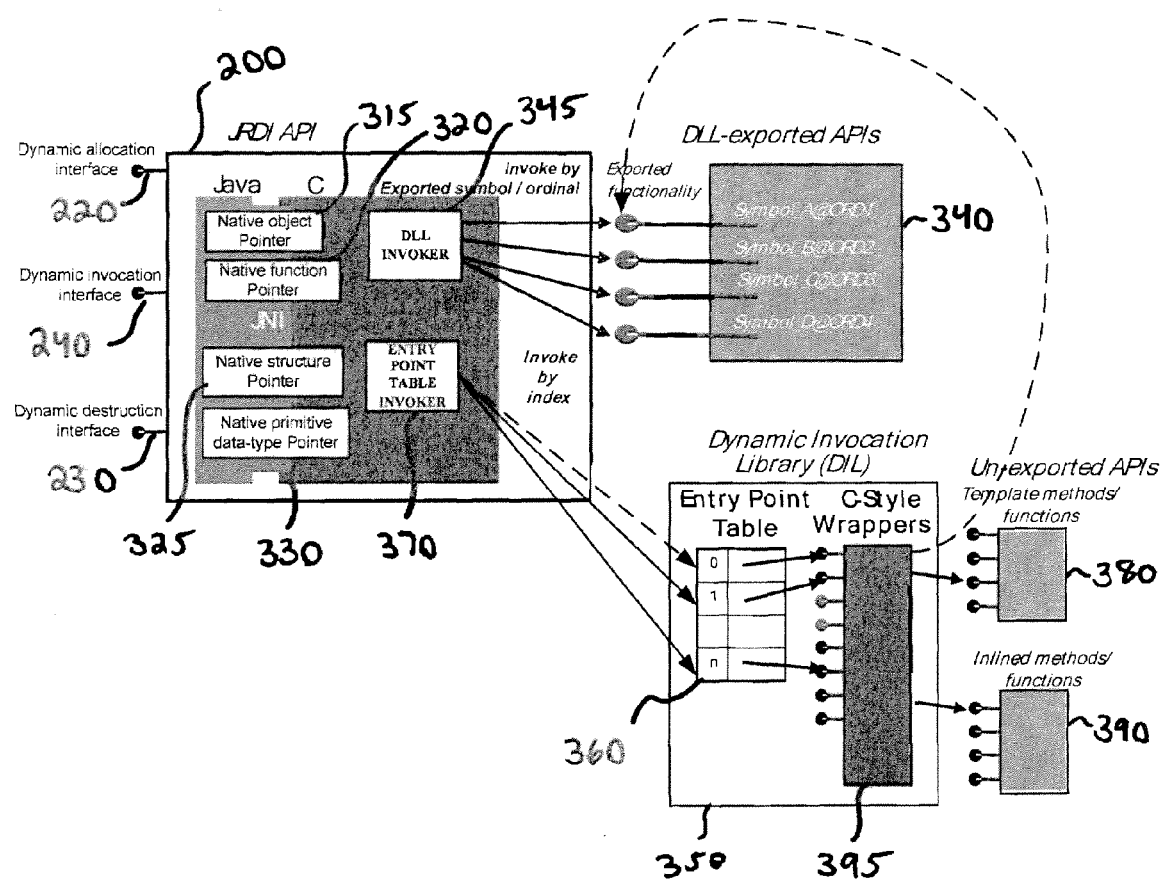
FIG. 3 is a depiction of one exemplary implementation of a JAVA™ Runtime Dynamic Invocation (JRDI) system constructed in accordance with the principles of the present invention.

FIG. 3 depicts two alternative mechanisms for implementing various embodiments of the present invention. As shown in FIG. 3, the JAVA™ JRDI API 200 provides the first and second JAVA™ consumers 210 and 215 with a set of JAVA™ methods for dynamic creation (via a construction or dynamic allocation interface 220), management (via the dynamic invocation interface 240) and destruction (via the dynamic destruction interface 230) of native objects, functions, structures, and primitive data-type variables at run-time. These interfaces are implemented by a set of general-purpose JAVA™ wrappers for different types of native pointers. Each JavaPointer component can be implemented by using the JNI™ approach. However, developers of JAVA™ consumers still do not need to write any JNI™ code. For example, a native object pointer component 315 can be considered as a JAVA™-side wrapper for a generic C++ object pointer. Such a component provides all of the needed methods to enable dynamic creation, invocation, and destruction of native objects. This component includes all of the needed JNI™ boilerplate code for creating, invoking, and destroying arbitrary native C++ objects from JAVA™ at run-time. In addition to object pointers, this implementation also allows JAVA™ consumers to create and destroy C/C++ function pointers, as well as pointers to native structures and primitive data-type variables. This implementation also permits JAVA™ consumers to use such pointers as method arguments or as values returned by methods/functions. These types of C++ pointers are represented in the by different JavaPointer components in FIG. 3—the native object pointer 315, a native function pointer 320, a native structure pointer 325, and a native primitive data-type pointer 330.

Upon the JRDI-based dynamic creation of a native entity from JAVA™, a new native variable/object is allocated on the heap, and a new JavaPointer instance is returned to JAVA™ applications for further usage. The dynamic destruction interface 230 allows JAVA™ applications to explicitly remove the created native entities from the heap.

With regard to the native APIs to invoke, the available C/C++ functions and C++ classes may have been either exported by a DLL or not (e.g., using template and inline functions/methods as well as inherited methods). C and C++ compilers treat these two alternatives differently, and such differences may have an impact on the implementation of the JRDI API 200. In particular, DLL-exported APIs 340 can be loaded and invoked at run-time without a DLL invoker 345 posing any API-specific build-time constraint to the native part of the JAVA™ component. However, native APIs typically also include other C/C++ definitions and declarations, such as template methods/functions 380 and inline methods/functions 390. These definitions and declarations can pose several build-time API-specific dependencies between the target APIs of the native platform and the native implementation of a JAVA™ consumer component. These dependencies are due to the fact that C/C++ compilers generate templates instantiations and expand inline code only at the calling block and add them statically to the calling component's object code at build-time.

Therefore, in addition to DLL-based invocation, an exemplary JRDI implementation may also include components for invoking functionality that does not have any corresponding entry points in DLLs and thus may pose some build-time dependencies to the mixed-language JAVA™ class. In this case, each native method can be wrapped in C-style wrappers 395 (commonly referred to as C functions) or, more generally, downcalling wrapper functions. Downcalling wrapper functions are functions that are used to wrap a call to a native c/c++ API in order to enable a downcall. A downcall refers to a call from a managed (e.g. JAVA™) component to a native (e.g. C/C++) function or method. The necessary wrappers can then be included into a dedicated library, namely a dynamic invocation library (DIL) 350. In addition to wrappers, the DIL 350 also includes an array of opaque function pointers. These pointers are referred to as an Entry Point Table (EPT) 360, which is used by the entry point table invoker component 370 of the JRDI library to perform the actual invocation of the needed existing native API.

In various embodiments, the JRDI framework relies on the invokers to actually invoke a given native method at run-time by using either DLL-based or EPT-based JRDI approach. For this purpose, in these embodiments the JRDI framework includes two primary invoker components, namely CDynLibInvoker and CEPTInvoker components. These components are derived from the same mixin class, namely MJRDInvoker, which represents the abstract core of the low-level invocation API. Each invoker instance is associated with an instance of a given native class that has been previously allocated on the heap during invoker's creation. Upon native object creation, each invoker holds a pointer to it that is represented by the iThisPointer member of the MJRDInvoker class. Such a pointer is subsequently used to invoke different methods on the target object instance.

The actual method-invocation approach relies on the assumption that the member functions to invoke are represented in native object code as calls to standard C functions. For example, invokers assume that the following method:
int MyClass::MyMethod(int anInt)
is compiled (and thus can be invoked) as a C function having the following prototype: int myclass_myMethod(MyClass * aThisPointer, int anInt)

It should be noted that method invocations are not necessarily converted to such a function call from C++ compilers. Therefore, it is assumed that the native C++ compiler supports this calling convention. If the compiler adopts a different conventions, the low-level JRDI API must support it explicitly. For example, MICROSOFT® C++ Win32 and ARM RVCT compilers support different default calling conventions and we had to deal with such a difference when implementing the JRDI proof-of-concept prototype.

In order to invoke a given method, invokers (both CEPTInvoker and CDynLibInvoker) typically retrieve a generic (function) pointer to it, and then cast it to a precise type representing a pointer to a function having a specific prototype. For example, in order to invoke the MyMethod method above, the retrieved function pointer should be cast to the T1ArgMethod type defined as follows:

```
typedef void* (*T2ArgFunction)(void *, void *)
[...............]
typedef T2ArgFunction T1ArgMethod;
```

It is also noted that, while the first void * argument of T1ArgMethod represents a pointer to the dynamic target-object instance (the so-called this pointer), the second void * argument represents the actual argument to pass to the native method, i.e., the int anInt input parameter of MyClass::MyMethod. A JavaPointer is in charge of converting arguments to void * representation, and of invoking the appropriate method on the right invoker at run-time. If the native method call returns any leave/error code, a JAVA™ exception is thrown. For example, for invoking the mentioned MyClass::MyMethod method, the JAVA™ consumer must invoke the InvokeIntOneArg argument of the JavaPointer. This method converts the argument to a void * and then invokes the CallOneArgOneWayWithReturn method on the right invoker as follows:

```
JNIEXPORT jint JNICALL
Java_com_nokia_jnai_jrdi_JavaPointer_invokeIntOneArg
    (JNIEnv * env, jobject, jint aHandle, jint aOrdinal, jint aArg, jboolean
    aByValue)
{
    TInt leaveCode = KErrNone;
    TInt errCode = KErrNone;
    TInt returnValue;
    //1. Get pointer to the invoker instance and cast it to a mixin
    //   pointer. We don't need to know what kind of invoker is it.
    MJRDInvoker* invoker = JavaUnhand<MJRDInvoker>(aHandle);
    //2. Perform method invocation
    if (!aByValue)
    {//2a. Passed by Reference: aArg address is used as a valid
    //  void * parameter for the invoker
    TRAP(leaveCode, errCode = (TInt)invoker->
    CallOneArgOneWayWithReturn(aOrdinal, &aArg));
    returnValue = aArg;}
    else
    {//2b. Passed by value: aArg value is cast to void * type
    //  in order for the invoker to retrieve it from the stack
    //  correctly
    TRAP(leaveCode, errCode =
    (TInt) invoker->CallOneArgOneWayWithReturn
    (aOrdinal, (void*)aArg));
        returnValue = errCode; // returns success value (KErrNone)
    }
    //3. Throw exception if any leaveCode / errorCode have been caught
    [......................]//
    //4. Send return value to JavaPointer Java-side
    return returnValue;
```

In one embodiment of the present invention, both DLL-based and EPT-based invocation of native APIs are enabled. According to this embodiment, in DLL-based invocation, a CDynLibInvoker component contains an RLibrary object that is used to dynamically load a certain target DLL containing one or more class implementations. The CDynLibInvoker component uses the RLibrary object at run-time to retrieve function pointers to exported methods by ordinal (by using a RLibrary::Lookup method) in accordance with the following code:

```
EXPORT_C void *
CDynLibInvoker::CallOneArgOneWayWithReturn(const TInt
aOpOrdinal, void *arg0) {
    TLibraryFunction myMethod= libLoader->Lookup(aOpOrdinal);
    return Invoke1ArgMethod(iThisPointer, (void *) myMethod, arg0,
    EFalse,
    ETrue/*returns something*/);
}
```

The invoked Invoke1ArgMethod of the CDynLibInvoker object then casts the retrieved generic (i.e., void *) function pointer to the appropriate function prototype, and then invokes the native method. For example, for invoking an int MyClass::MyMethod(int anInt), the function pointer should be cast to a T1ArgMethod (i.e. T2ArgFunction) pointer and then invoked as a 2-arguments function as follows:

```
void * Invoke1ArgMethod
    ( void * thisObj, void * methodToCall, void * arg0, const TBool
    isStatic, const TBool returnsSomething )
    {if(returnsSomething)
```

```
    {T1ArgMethod ourMethod=(T1ArgMethod)methodToCall;
    return ourMethod(thisObj, arg0);
    }
    else
    {
    T1ArgMethodNoReturn
    ourMethod=(T1ArgMethodNoReturn)methodToCall;
    ourMethod(thisObj, arg0);
    }
}
```

EPT-based invocation is similar to DLL-based invocation in that the CEPTInvoker must retrieve the appropriate function pointer as a void pointer, cast it to the actual function pointer type to use, and invoke it. However, a primary difference with EPT-based invocation involves the function-pointer retrieval mechanism. While the CDynLibInvoker relies on the assumption that the method to invoke is available at a given ordinal of a given DLL, the CEPTInvoker has no DLL to refer to since the native functionality is not exported by any existing DLL. In order to invoke unexported native APIs, each required method/function of such APIs must be wrapped in a C-style wrapper function having the same prototype as the appropriate function prototype to use (e.g. T2ArgFunction). For example, the MyClass::MyMethod method could be wrapped in a C-style wrapper function defined as follows:

```
int JW_MyClass_MyMethod(MyClass * thisPtr, int anInt){
    return thisPtr->MyMethod(anInt);
}
```

During the construction of a new JavaPointer, the CEPTInvoker instance is initialized by providing it with an array of pointers to all the required wrapper functions related to MyClass. Such an array is defined as follows:

```
const unsigned int EPT[ ]=
    {
        (unsigned int)JW_MyClass,            //0
        (unsigned int)JW_MyClass_MyMethod,    //1
        (unsigned int)JW_MyClass_MySecondMethod, //2
    }
```

Given such an array, in order to invoke the mentioned MyClass::MyMethod method, the CEPTInvoker can retrieve the pointer to the JW_MyClass_MyMethod wrapper, and then invoke it by using the generic CEPTInvoker::Invoke2ArgFunction method as follows:

```
EXPORT_C void *
CEPTInvoker::CallOneArgOneWayWithReturn(const TInt
aOpIndex, void *arg0){
    return Invoke2ArgFunction((void *)iEPT[aOpIndex],
    iThisPointer, arg0, ETrue/*returns something*/);
}
```

It is also noted that EPT-based invocation can be used to provide JAVA™-side setter and getter methods to access a given Class/object member variables. For example, a setter method for the OneField member of the MyClass class could be invoked by means of the following wrapper function:

```
void JW_MyClass_SET_OneField(MyClass * thisPtr, int newValue){
thisPtr->OneField=newValue;
}
```

A JavaPointer instance can hold one CEPTInvoker, as well as multiple CDynLibInvoker instances. This approach results in forcing each EPT to contain all of the DLL-unexported methods that the JAVA™ consumer wishes to invoke on a given object, including methods belonging exactly to object's class as well as to its mother class(es). In other words, inherited methods are always explicitly wrapped by a DIL, and thus explicitly represented in a certain class' EPT.

Both the DLL-based and EPT-based approaches assume that the JAVA™ developer knows beforehand the C/C++ signature of the native functionality that his application is interested in consuming. Therefore, these approaches requires developers to consult native service documentation, but in any case developers must be aware of native platform's APIs if they want to use them.

Figure 4:
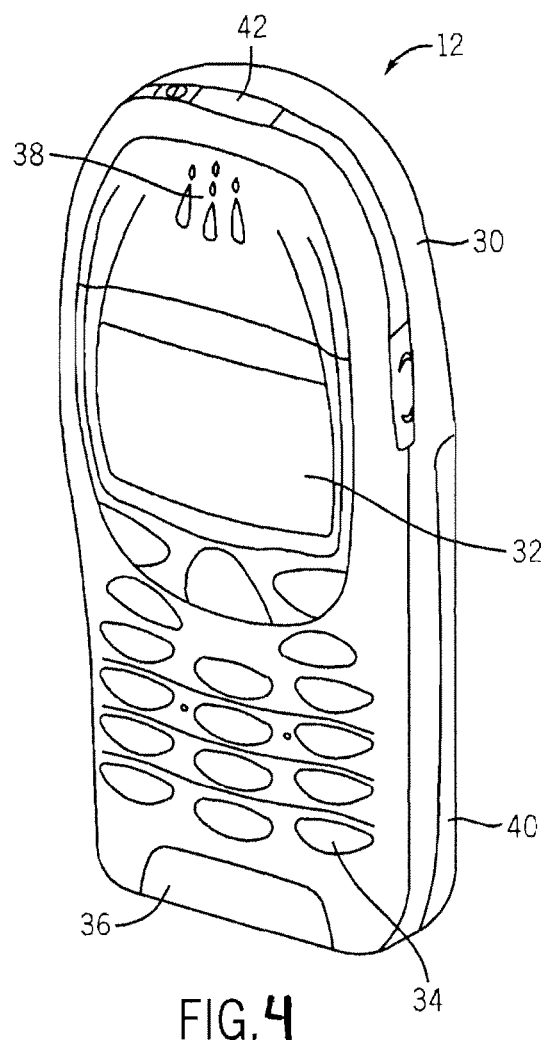
FIG. 4 is a perspective view of a mobile telephone that can be used in the implementation of the present invention.
Figure 5:
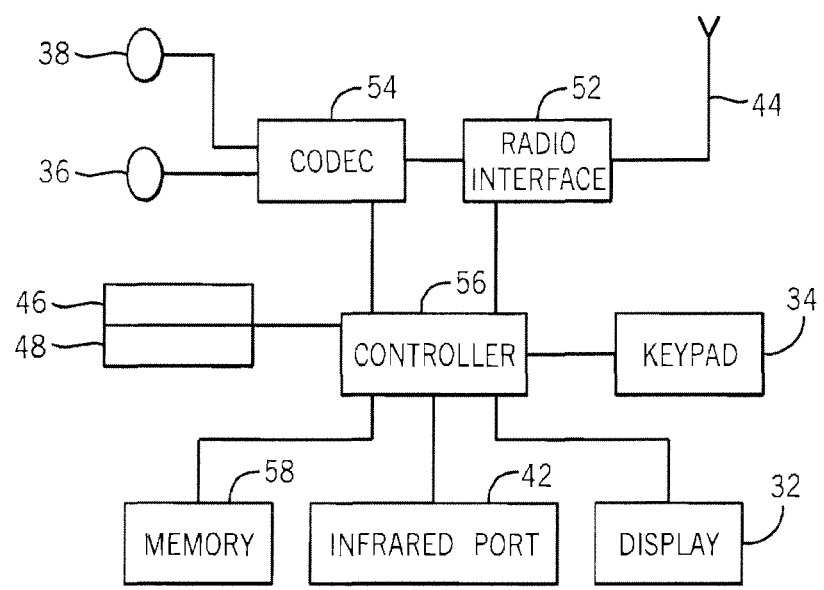
FIG. 5 is a schematic representation of the telephone circuitry of the mobile telephone of FIG. 4.

FIGS. 4 and 5 show one representative electronic device 12 within which the present invention may be implemented. It should be understood, however, that the present invention is not intended to be limited to one particular type of electronic device 12 or other electronic device. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the NOKIA™ range of mobile telephones.

Communication devices implementing the various embodiments of the present invention may be capable of communicating using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), BLUETOOTH®, IEEE 802.11, etc. A communication device may communicate using various media including, but not limited to, radio, infrared, laser, cable connection, and the like. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of reducing the static footprint of mixed-language classes in an electronic device, comprising:
   providing a runtime dynamic invocation (RDI) application program interface (API) configured to interact with applications and native APIs; and
   permitting the applications to manipulate native language entities at ran-time via the RDI API using a plurality of interfaces, without necessitating additional application-specific native code,
   wherein the native language entities available for manipulation by the applications include objects, primitive data-type variables, structures, and function pointers.

2. The method of claim 1, wherein the plurality of interfaces each include boilerplate code necessary for the desired manipulation of the native language entities.

3. The method of claim 1, wherein the plurality of interfaces include a construction interface, and wherein the construction interface is used by the application to create desired basic native language entities.

4. The method of claim 1, wherein the plurality of interfaces include a destruction interface, and wherein the destruction interface is used by the application to destroy desired basic native language entities.

5. The method of claim 1, wherein the plurality of interfaces include an invocation interface, and wherein the invocation interface is used by the application to invoke native language methods and functions at runtime.

6. The method of claim 1, wherein the manipulation of the native language entities includes using the RDI API to at least selectively invoke native APIs exported by a dynamic link library.

7. The method of claim 1, wherein the manipulation of the native language entities includes using the RDI API to at least selectively invoke native APIs that have not been exported by a dynamic link library.

8. The method of claim 7, wherein the unexported native APIs are each wrapped in at least one downcalling wrapper function.

9. The method of claim 8, wherein the wrapped, unexported native APIs are included in a dynamic invocation library.

10. The method of claim 9, wherein the dynamic invocation library includes an entry point table, the entry point table usable by the RDI for performing the invocation of an existing native API.

11. The method of claim 7, wherein the unexported native APIs include template functions and inlined functions.

12. The method of claim 1, wherein a plurality of Pointers are used to dynamically represent native entities on a side of the RDI API.

13. The method of claim 12, wherein the plurality of Pointers include at least one native object pointer, native function pointer, native primitive data-type pointer and native structure pointer.

14. A computer program product, embodied in a non-transitory computer readable medium, comprising:
    computer code for providing a runtime dynamic invocation (RDI) application program interface (API) configured to interact with applications and native APIs; and
    computer code for permitting the applications to manipulate native language entities at run-time via the RDI API using a plurality of interfaces, without necessitating additional application-specific native code,
    wherein the native language entities available for manipulation by the applications include objects, primitive data-type variables, structures, and function pointers.

15. The computer program product of claim 14, wherein the plurality of interfaces each include boilerplate code necessary for the desired manipulation of the native language entities.

16. The computer program product of claim 14, wherein the plurality of interfaces include a construction interface, and wherein the construction interface is used by the application to create desired basic native language entities.

17. The computer program product of claim 14, wherein the plurality of interfaces include a destruction interface, and wherein the destruction interface is used by the application to destroy desired basic native language entities.

18. The computer program product of claim 14, wherein the plurality of interfaces include an invocation interface, and wherein the invocation interface is used by the application to invoke native language methods and functions at runtime.

19. The computer program product of claim 14, wherein the manipulation of the native language entities includes using the RDI API to at least selectively invoke native APIs that have not been exported by a dynamic link library.

20. The computer program product of claim 19, wherein the unexported native APIs are each wrapped in at least one downcalling wrapper function.

21. The computer program product of claim 20, wherein the wrapped, unexported native APIs are included in a dynamic invocation library.

22. The computer program product of claim 21, wherein the dynamic invocation library includes an entry point table, the entry point table usable by the RDI for performing the invocation of an existing native API.

23. The computer program product of claim 14, wherein a plurality of Pointers are used to dynamically represent native entities on a side of the RDI API.

24. An apparatus, comprising:
    a processor; and
    a memory unit communicatively connected to the processor and including a runtime dynamic invocation (RDI) application program interface (API) configured to permit applications to manipulate native language entities at run-time via the RDI API using a plurality of interfaces, without necessitating additional application-specific native code,
    wherein the native language entities available for manipulation by the applications include objects, primitive data-type variables, structures, and function pointers.

25. The apparatus of claim 24, wherein the plurality of interfaces each include boilerplate code necessary for the desired manipulation of the native language entities.

26. The apparatus of claim 24, wherein the plurality of interfaces include a construction interface, and wherein the construction interface is used by the application to create desired basic native language entities.

27. The apparatus of claim 24, wherein the plurality of interfaces include a destruction interface, and wherein the destruction interface is used by the application to destroy desired basic native language entities.

28. The apparatus of claim 24, wherein the plurality of interfaces include an invocation interface, and wherein the invocation interface is used by the application to invoke native language methods and functions at runtime.

29. The apparatus of claim 24, wherein the manipulation of the native language entities includes using the RDI API to at least selectively invoke native APIs exported by a dynamic link library.

30. The apparatus of claim 24, wherein the manipulation of the native language entities includes using the RDI API to at least selectively invoke native APIs that have not been exported by a dynamic link library.

31. The apparatus of claim 30, wherein the unexported native APIs are each wrapped in C-style wrappers.

32. The apparatus of claim 31, wherein the wrapped, unexported native APIs are included in a dynamic invocation library.

33. The apparatus of claim 32, wherein the dynamic invocation library includes an entry point table, the entry point table usable by the RDI for performing the invocation of an existing native API.

34. The apparatus of claim 30, wherein the unexported native APIs include template functions and inlined functions.

35. The apparatus of claim 24, wherein a plurality of Pointers are used to dynamically represent native entities on a side of the RDI API.

36. The apparatus of claim 35, wherein the plurality of Pointers include at least one native object pointer, native function pointer, native primitive data-type pointer and native structure pointer.

* * * * *

UNITED STATES PATENT AND TRADEMARK OFFICE
CERTIFICATE OF CORRECTION

| | | |
|---|---|---|
| PATENT NO. | : 8,756,616 B2 | Page 1 of 1 |
| APPLICATION NO. | : 11/618518 | |
| DATED | : June 17, 2014 | |
| INVENTOR(S) | : Di Flora | |

It is certified that error appears in the above-identified patent and that said Letters Patent is hereby corrected as shown below:

In the Specification

Column 1, Line 29      Replace "Native Interface (JNI$^{TM}$) The" with

-- Native Interface (JNI$^{TM}$). The --

In the Claim

Column 10, Line 33, Claim 1      Replace "ran-time via the" with

-- run-time via the --

Signed and Sealed this
Seventh Day of October, 2014

Michelle K. Lee
*Deputy Director of the United States Patent and Trademark Office*